United States Patent
Averbuch et al.

(10) Patent No.: US 8,121,975 B2
(45) Date of Patent: Feb. 21, 2012

(54) CREATING PIVOT TABLES FROM TABULAR DATA

(75) Inventors: Yaacov Averbuch, Netanya (IL); Uri Rubin, Ramat Gan (IL)

(73) Assignee: Panorama Software Inc., New York, NY (US)

( * ) Notice: Subject to any disclaimer, the term of this patent is extended or adjusted under 35 U.S.C. 154(b) by 453 days.

(21) Appl. No.: 12/071,318

(22) Filed: Feb. 20, 2008

(65) Prior Publication Data

US 2009/0210430 A1    Aug. 20, 2009

(51) Int. Cl.
*G06F 17/30* (2006.01)
(52) U.S. Cl. .............. 707/600; 707/607; 707/999.107
(58) Field of Classification Search ............... 707/607, 707/600, 999.107
See application file for complete search history.

(56) References Cited

U.S. PATENT DOCUMENTS

| | | | |
|---|---|---|---|
| 6,581,068 B1* | 6/2003 | Bensoussan et al. | 1/1 |
| 6,775,675 B1* | 8/2004 | Nwabueze et al. | 707/600 |
| 6,853,994 B1* | 2/2005 | Gupta | 707/694 |
| 6,907,428 B2 | 6/2005 | Fitzpatrick et al. | |
| 7,185,279 B2 | 2/2007 | Machalek | |
| 7,213,199 B2 | 5/2007 | Humenansky | |
| 7,386,571 B2* | 6/2008 | Gupta | 1/1 |
| 7,418,459 B2* | 8/2008 | Gupta | 1/1 |
| 7,562,086 B2* | 7/2009 | Mirchandani et al. | 1/1 |
| 7,630,956 B2* | 12/2009 | Wyatt et al. | 1/1 |
| 7,664,804 B2* | 2/2010 | Battagin et al. | 707/804 |
| 7,818,286 B2* | 10/2010 | Chu et al. | 707/600 |
| 2002/0099581 A1* | 7/2002 | Chu et al. | 705/7 |
| 2003/0009649 A1 | 1/2003 | Martin et al. | |
| 2004/0237029 A1 | 11/2004 | Medicke et al. | |
| 2005/0289129 A1* | 12/2005 | Schmitt | 707/3 |
| 2006/0024653 A1 | 2/2006 | Battagin et al. | |
| 2006/0271841 A1 | 11/2006 | Thanu et al. | |
| 2007/0088691 A1 | 4/2007 | Dickerman et al. | |
| 2007/0239476 A1 | 10/2007 | Rohan et al. | |
| 2007/0260578 A1 | 11/2007 | Ghosh | |
| 2008/0215370 A1* | 9/2008 | Dent et al. | 705/3 |

* cited by examiner

*Primary Examiner* — Jean M Corrielus

(57) ABSTRACT

System and method of simultaneously creating and managing a plurality of OLAP cubes in real time, each from a different tabular data source, comprising, for each cube, defining the table columns as either dimensions or measures of the cube using at least one of predefined semantics and data formats, generating the cube using said defined dimensions and measures, updating the cube when the respective data source is modified and deleting the cube according to predefined criteria.

18 Claims, 5 Drawing Sheets

|   | A | B | C | D | E | F | G | H |
|---|---|---|---|---|---|---|---|---|
| 1 | Country | State | City | Date | Customer Name | Customer Gender | Units | Revenue $ |
| 2 | USA | California | Los Angeles | 5/10/06 | Murdoch | M | 150 | 1,500.00 |
| 3 | France |  | Paris | 2/28/06 | Mirabo | M | 80 | 900.00 |
| 4 | USA | New York | Albany | 5/10/06 | Adler | F | 95 | 1,100.00 |
| 5 | USA | New York | New York | 5/22/07 | Perkins | M | 250 | 2,500.00 |
| 6 | Germany |  | Bonn | 2/28/06 | Schmidt | M | 200 | 2,000.00 |
| 7 | USA | Washington | Seattle | 10/16/07 | Young | F | 100 | 1,000.00 |
| 8 | USA | California | Ervine | 10/20/07 | Williams | M | 500 | 4,000.00 |
| 9 | USA | Mass. | Boston | 10/20/07 | Jones | M | 300 | 3,000.00 |
| 10 | UK |  | London | 7/2/07 | Smith | F | 75 | 850.00 |
| 11 | USA | Rhode Island | Providence | 5/10/06 | Wallace | M | 150 | 1,500.00 |
| 12 | Israel |  | Jerusalem | 4/20/07 | Peleg | M | 100 | 1,100.00 |
| 13 | USA | Washington | Redmond | 5/22/07 | Queens | M | 400 | 3,600.00 |
| 14 | USA | New York | Brighton | 4/20/07 | Morris | F | 200 | 2,000.00 |

Fig. 1 (Prior Art)

| Sum of Units | Ship Date | | | | | | |
|---|---|---|---|---|---|---|---|
| Country | 2/28/06 | 5/10/06 | 4/20/07 | 5/22/07 | 7/2/07 | 10/16/07 | 10/20/07 |
| USA | | 395 | 200 | 650 | | 100 | 800 |
| France | 80 | | | | | | |
| Germany | 200 | | | | | | |
| UK | | | 100 | | 75 | | |
| Israel | | | | | | | |

Fig. 2 (Prior Art)

| Country | State | 2006 Q1 | 2006 Q2 | 2006 Q3 | 2006 Q4 | 2007 Q1 | 2007 Q2 | 2007 Q3 | 2007 Q4 |
|---|---|---|---|---|---|---|---|---|---|
| USA | California |  | 150 |  |  |  |  |  | 500 |
|  | New York |  | 95 |  |  |  |  |  |  |
|  | Washington |  |  |  |  |  | 450 |  |  |
|  | Mass. |  |  |  |  |  | 400 |  | 100 |
|  | Rhode Island |  | 150 |  |  |  |  |  | 300 |
| France |  | 80 |  |  |  |  |  |  |  |
| Germany |  | 200 |  |  |  |  |  |  |  |
| UK |  |  |  |  |  |  |  | 75 |  |
| Israel |  |  |  |  |  |  | 100 |  |  |

SLICERS: Country | State | City | Date | Customer Name | Customer Gender | Units | Revenue $

Fig. 4

CREATING PIVOT TABLES FROM TABULAR DATA

FIELD OF THE INVENTION

The invention relates to computer-implemented techniques for providing multi-dimensional views from tabular data.

BACKGROUND OF THE INVENTION

A spreadsheet is a computer application displaying rectangular table (or grid) of information, consisting of text and numbers, for example financial information. A spreadsheet may furthermore contain formulas that give rules for computing certain values in the table from other values, such as the total value of a column, which is computed by adding the values above it.

The advent of advanced web technologies, such as Ajax and XUL, has propelled the emergence of a new generation of online spreadsheets. Equipped with a rich Internet application user experience. Many of the web based online spreadsheets boast the same features seen in desktop spreadsheet applications. Some already surpass them, offering real time updates from remote sources such as stock prices and currency exchange rates.

Google Docs is a free, Web-based word processor, spreadsheet, and presentation application offered by Google. It allows users to create and edit documents online while collaborating in real-time with other users.

Various Web services are available to users. Web services are defined by the World Wide Web Consortium (W3C) as software systems designed to support interoperable Machine to Machine interaction over a network. Web services are frequently just Web APIs that can be accessed over a network, such as the Internet, and executed on a remote system hosting the requested services. The W3C Web service definition encompasses many different systems, but in common usage the term refers to clients and servers that communicate using XML messages that follow the SOAP standard. Common in both the field and the terminology is the assumption that there is also a machine readable description of the operations supported by the server written in the Web Services Description Language (WSDL).

The data provided by various web services is tabular data, or may be converted to tabular format using the description provided. For example, Google Finance is a web service providing stock information and other financial data of worldwide companies and Google Analytics is a web service providing information on traffic on a user's website.

Other significant tabular data sources are various report generators such as SQL queries, Crystal Reports, Business Objects and others.

A pivot table is an interactive table that automatically extracts, organizes, and summarizes data. It can be used to analyze the data, make comparisons, detect patterns and relationships, and discover trends as well as other data related operations and discovery.

Today, many applications provide pivot tables or equivalent functionality, but the best-known modern implementation of the concept is in the dominant spreadsheet application, Microsoft Excel. A pivot table can be graphically represented in a pivot chart.

For typical data entry and storage, data are usually flat. Flat means that it consists of only columns and rows, such as shown in FIG. 1.

While there is a lot of information stored in such data, it is very difficult to gather the information you want out of it. A pivot table can help one quickly summarize the flat data, giving it depth, and get the information they want. The usage of a pivot table is extremely broad and depends on the situation. The first question to ask is, "what am I looking for?". In the example here, let's ask "How many Units did we sell in each country for every Ship Date?". The resulting pivot table is shown in FIG. 2.

A pivot table usually consists of rows, columns, and data (or fact) fields. In this case, the row is Country, the column is Ship Date, and the data we would like to see is Units. These fields were added onto the pivot table from a list of available fields. Pivot tables also allow several kinds of aggregations including: sum, average, standard deviation, count, etc. Rows and columns can be nested to provide Cartesian multiplication of two or more dimensions.

Using the example above, it will find all distinct records for Country. In this case, they are: USA, France, Germany, UK and Israel. Furthermore, it will find all distinct records for Ship Date.

Existing tools for creating pivot tables from spreadsheets have several disadvantages compared to tools for creating pivot tables from multi-dimensional databases. For example:

1. All dimensions (columns) in a pivot table created from a spreadsheet appear as flat, thus hierarchies cannot be created, such as a year\quarter\months hierarchy from a date column, or a Country\State\City\Customers hierarchy.
2. Calculation that are created on top of the spreadsheet pivot table are Excel calculations, i.e. they are based on R1C1 convention, while OLAP relates to entities (members), i.e. in Excel one would do A6+B6, while in OLAP one could do Q1+Q2.
3. Columns do not 'tell' what they are while dimension do (i.e. Time dimension Vs. Col 6).
4. OLAP can work on larger amounts of data than e.g. Microsoft Excel Pivot can provide US Published Application No. 2007/0260578, assigned to Microsoft Corp., discloses a method and apparatus that allow the user to view advanced data-base pivot tables in spreadsheets, from any relational database, by creating a temporary cube on the local machine from the relational database. The pivot tables interact with the temporary cube to provide the data to the user.

U.S. Pat. No. 7,213,199, assigned to Cognos Inc., discloses an extension to a conventional spreadsheet application, for interacting with multidimensional databases. Instances of the extended spreadsheet application execute on a client computer and present a user with a two-dimensional representation of a portion of the multi-dimensional database.

Thus there is need for a method and system for creating pivot tables from spreadsheets, or any other tabular data source, e.g. SQL server tables or Web services or RDB based reports, whereby multi-dimensional capabilities may be provided.

SUMMARY OF THE INVENTION

In a first aspect of the present invention there is provided a method of simultaneously creating and managing a plurality of OLAP cubes in real time, each from a different tabular data source, comprising, for each cube, the steps of defining the table columns as either dimensions or measures of the cube using at least one of predefined semantics and data formats, generating the cube using said defined dimensions and measures, updating the cube when the respective data source is modified and deleting the cube according to predefined criteria.

According to a first embodiment of this aspect, the dimensions include hierarchies.

According to a second embodiment of this aspect, the hierarchies are inferred automatically using at least one of said predefined semantics and predefined data formats.

According to a third embodiment of this aspect, the method further comprises a caching mechanism for managing the cubes.

According to a fourth embodiment of this aspect, the tabular data source is in spreadsheet form.

According to a fifth embodiment of this aspect, the tabular data source is a web service.

According to a sixth embodiment of this aspect, the tabular data source comprises data convertible to tabular format.

According to a seventh embodiment of this aspect, the tabular data source is a report in any reporting tool based on a relational source.

In a second aspect of the present invention there is provided a system for simultaneously providing OLAP cube capabilities in real time to a plurality of tabular data users comprising a system server, a plurality of client computers communicating with the server and at least one tabular data source communicating with the server or with at least one of the client computers, the server comprising means for receive tabular data and means for generating cubes therefrom, said means for generating cubes comprising means for defining the table columns as either dimensions or measures of the cube using at least one of predefined semantics and data formats, the server further comprising means for updating cubes and means for deleting cubes according to predefined criteria.

According to a first embodiment of this aspect, the server comprises a caching mechanism for managing the plurality of cubes simultaneously.

According to a second embodiment of this aspect, the means for defining comprise automatic means.

According to a third embodiment of this aspect, the means for defining comprise means for defining hierarchies.

According to a fourth embodiment of this aspect, the means for defining hierarchies are automatic.

According to a fifth embodiment of this aspect, the tabular data source is in spreadsheet form.

According to a sixth embodiment of this aspect, the tabular data source is a web service.

According to a seventh embodiment of this aspect, the tabular data source comprises data convertible to tabular format.

According to an eighth embodiment of this aspect, the tabular data source is a report in any reporting tool based on a relational source.

In a third aspect of the present invention there is provided a method of simultaneously creating and managing a plurality of OLAP cubes in real time, from data sources comprising a plurality of spreadsheets provided by at least one Web Service allowing spreadsheet format data to be displayed, comprising, for each cube, the steps of defining the spreadsheet columns as either dimensions or measures of the cube using at least one of predefined semantics and data formats, generating the cube using said defined dimensions and measures, updating the cube when the respective data source is modified and deleting the cube according to predefined criteria.

According to a first embodiment of this aspect, the dimensions include hierarchies.

According to a second embodiment of this aspect, the hierarchies are inferred automatically using at least one of said predefined semantics and predefined data formats.

According to a third embodiment of this aspect, the method further comprises a caching mechanism for managing the cubes.

In a fourth aspect of the present invention there is provided a computerized system for simultaneously providing OLAP cube capabilities in real time to a plurality of data sources comprising a plurality of spreadsheets provided by at least one Web Service allowing spreadsheet format data to be displayed, comprising a system server, a plurality of client computers communicating with the server and at least one Web Service allowing spreadsheet format data to be displayed communicating with the server or with at least one of the client computers, the server comprising means for receive spreadsheet data and means for generating cubes therefrom, said means for generating cubes comprising means for defining the spreadsheet columns as either dimensions or measures of the cube using at least one of predefined semantics and data formats, the server further comprising means for updating cubes and means for deleting cubes according to predefined criteria.

According to a first embodiment of this aspect, the server comprises a caching mechanism for managing the plurality of cubes simultaneously.

According to a second embodiment of this aspect, the means for defining comprise automatic means.

According to a third embodiment of this aspect, the means for defining comprise means for defining hierarchies.

According to a fourth embodiment of this aspect, the means for defining hierarchies are automatic.

In a fifth aspect of the present invention there is provided a computer-readable medium having computer-executable instructions stored thereon which, when executed by a computer, will cause the computer to perform the method of simultaneously creating and managing a plurality of OLAP cubes in real time, each from a different tabular data source, comprising, for each cube, the steps of defining the table columns as either dimensions or measures of the cube using at least one of predefined semantics and data formats, generating the cube using said defined dimensions and measures, updating the cube when the respective data source is modified and deleting the cube according to predefined criteria.

According to a first embodiment of this aspect, the data sources comprise at least one Web Service allowing spreadsheet format data to be displayed.

BRIEF DESCRIPTION OF THE DRAWINGS

For a better understanding of the invention and to show how the same may be carried into effect, reference will now be made, purely by way of example, to the accompanying drawings.

With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice. In the accompanying drawings:

FIG. 1 is an exemplary table used as input for the method of the present invention;

FIG. 2 is an exemplary pivot table created from the data of FIG. 1 according to prior art methods;

FIG. 4 is an exemplary pivot table created from the data of FIG. 1 according to the method of present invention.

DETAILED DESCRIPTION OF PREFERRED EMBODIMENTS

Figure 3:
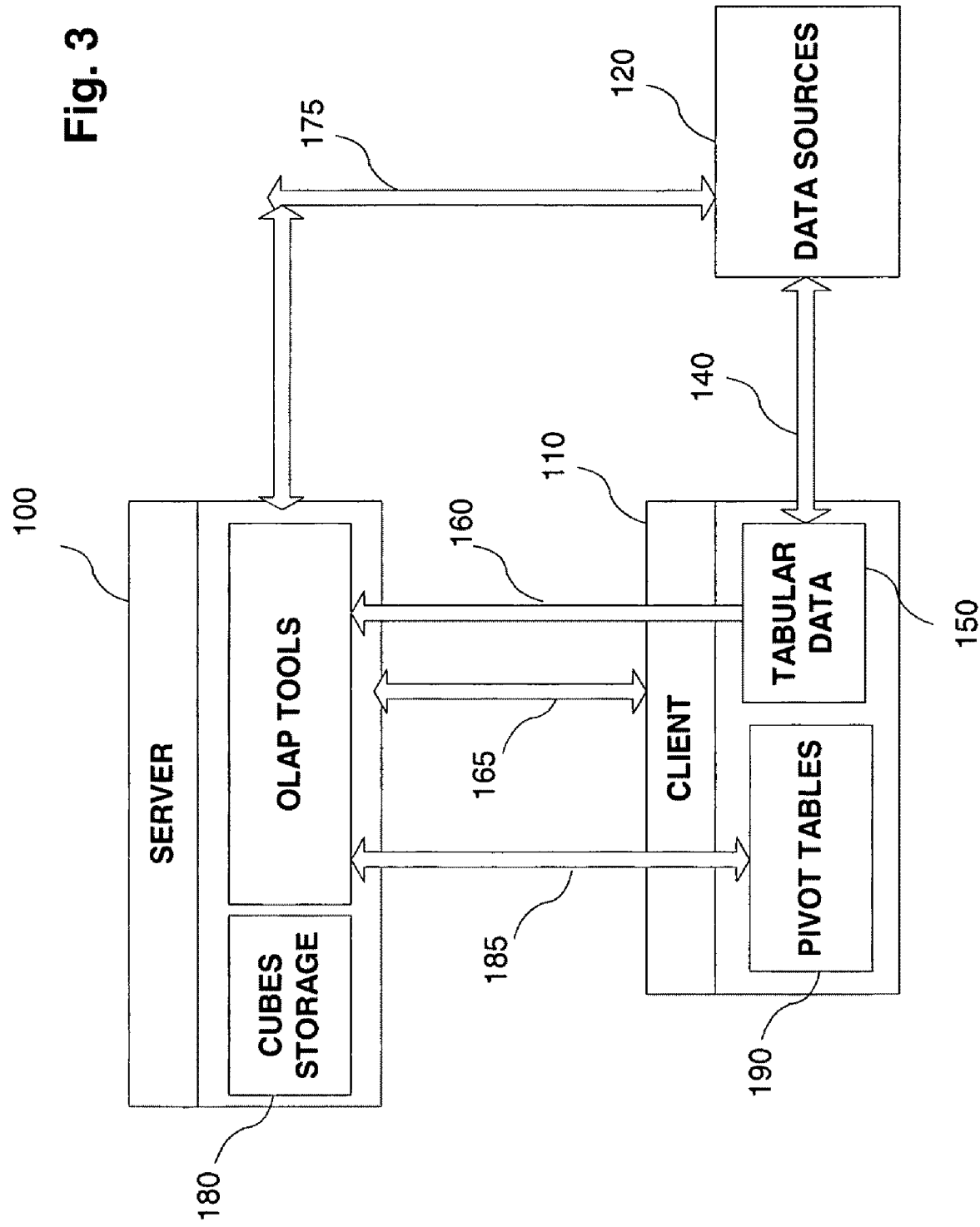
FIG. 3 is a schematic representation of an exemplary system for supporting the method of the present invention.

The present invention attempts to overcome the shortcomings of existing tools for creating pivot tables from spreadsheets or any tabular data source by providing OLAP capabilities.

Before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

For a better understanding of the invention, its operating advantages and the specific objects attained by its uses, reference should be made to the accompanying drawings and descriptive matter in which there is illustrated exemplary embodiments of the invention.

FIG. 3 is a schematic representation of an exemplary system for supporting the method of the present invention. The system comprises a server (100), at least one client computer (110) and data sources (120).

Client(s) (110) send (165) data requests to server (100) and server (100) redirects (175) the requests to data sources (120) and receives in response tabular data, or data transformable to tabular form. Alternatively, client (110) sends data requests (140) directly to the data source (120) and receives in response tabular data, or data transformable to tabular form. The data request may be, for example, SQL query directed to a relational database, request for a spreadsheet or a specific spreadsheet page, or any Web Service query using an appropriate API.

Data sources (120) may be comprised of remote data sources such as any Web Service server (e.g. Google Analytics) or Web Services allowing spreadsheet format data to be displayed (e.g. Google Spreadsheet). Data sources (120) may additionally or alternatively comprise local data sources storing spreadsheets and/or other tabular data, such as organizational relational databases.

The tabular data (150) received from data sources (120) is communicated (160) to the server (100) OLAP tools module (170), optionally using a 'desktop gadget' stored on the client computer (110). Desktop gadgets are interactive mini-applications that can be placed anywhere on the user's desktop.

OLAP tools module (170) creates a temporary mini-cube according to the user's preferences, as will be explained in detail below, stores the newly created cube in the cubes storage (180), and communicates (185) the required pivot table view to the client computer (110) for display, preferably using a desktop gadget.

Cubes storage (180) may hold a large number of temporary mini-cubes and preferably comprises a large cache memory, enabling the system to service multiple client computers (110) concurrently and update them in real time.

When data changes in the source data store, the cube data is updated in real time to reflect these changes, using mechanisms provided by the source data provider, such as events raised by Google when data in a spreadsheet changes. Another possible updating mechanism may be calling the web service periodically (e.g. every 5 min) to check whether the data has been changed.

Server (100) preferably comprises an intelligent caching mechanism and an automatic clean-up mechanism for deleting cubes from cubes storage (180) according to predefined criteria such as, for example, end of session, changes to the tabular data from which the cube originated, time lapsed since the creation of the cube, etc.

The process of creating a cube from tabular data will now be described, in conjunction with FIG. 4.

In a preferred embodiment of the present invention, semantics are used to help "understand" the various dimensions and measures so that the cube may subsequently be interrogated intelligently and provide desired views.

Semantics may be inferred automatically or with the help of the user. Often a combination of both is required. For example, referring back to FIG. 1, The Date column may automatically be inferred as containing dates, by analyzing the data format in the column. In the example of FIG. 1, the dates comprise month, day and year. In a different format, hour and minute could be given, etc. In the cube created from this example, the dates may thus be a basis for various aggregations, as shown in FIG. 4, where an aggregation by quarters is displayed.

A second example of automatic semantics inference can be applied to the Revenue column (FIG. 1), in which the format of the numbers suggests monetary data and to the Units column, where the format of the numbers suggests number of units.

Other columns, such as the Gender column or the City column may be given semantic interpretations by the user, or alternatively be treated as undefined textual data.

Another feature of the cube which may be used for enhancing subsequently views is the ability to hold hierarchies. In the example of FIG. 4, a hierarchy is shown, created from the Country and State columns of FIG. 1. The hierarchy may be created automatically, given that Country and State semantics have previously been defined. Alternatively, the user may define the hierarchy using a UI tool provided for this purpose.

The cube created from the table of FIG. 1 will have Units and Revenue as measures, using the original data formats. The dimensions may be defined for each column, or according to a defined/inferred hierarchy, as explained above.

The resulting cube may be small relative to standard OLAP cubes. Since the temporary cube of the present invention deals with relatively small amounts of data, a preferred embodiment may save the overhead of various calculations performed on the data which are held in standard OLAP cubes. Alternatively, queries may be directed to the data source itself, or to a report based on the data source and may advantageously be SQL queries. In the latter option, we have created an automatic semantics layer on any relational source\report, thus changing it from static into a live dynamic entity. According to this embodiment, the temporary cube may hold only the semantics and no data. All queries are being translated using the semantics to SQL and run directly against the relational data source.

The advantage to the user will be in being provided a convenient tool whereby he can use the cube dimensions for performing operations such as aggregations and hierarchies and drill the data in different views and do analysis in various ways that are open only to SQL power users.

Figure 5:
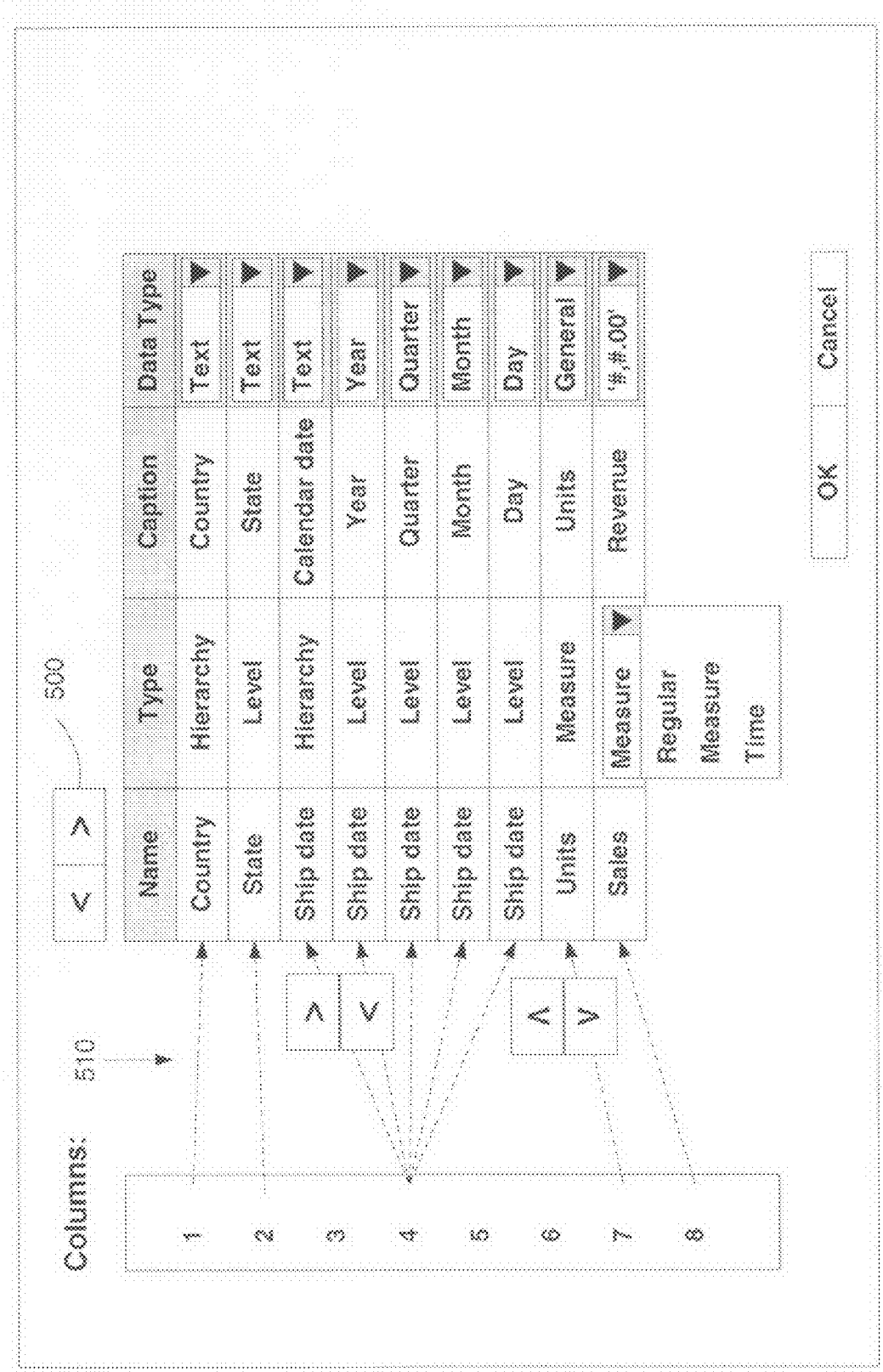
FIG. 5 is an exemplary UI for the generation of a cube from the data of FIG. 1 according to an embodiment of the present invention.

FIG. 5 depicts an exemplary UI for the generation of a cube from the spreadsheet of FIG. 1. The extent to which the user assistance is required depends on the information provided by the data source, e.g. arbitrary table versus XL spreadsheet and on the semantics defined in the system. For example, the Country-State hierarchy could be inferred automatically using semantics, or the user may use the indentation tool 500 to specify that State should be nested under Country. The same goes for Ship date, where a multiple-level hierarchy may be inferred or defined by the user. Dotted arrows 510, which are not part of the UI, demonstrate the transition between the tabular data source and the cube's dimensions and measures. Each column in the original table may provide one or more entries to the cube's definition. For example, the Country column in the example of FIG. 1 provides the first row, while the Date column provides five rows. The columns in the example are numbered from left to right, to demonstrate the general nature of the method, which is not restricted to XL spreadsheets where the columns are identified by letters. Alternatively, the columns may be identified by their headers, e.g. in spreadsheets (first row of range) or by the field name, e.g. in relational tables or web service result. As can be seen, not all columns have to participate in the cube. In the example, columns 3 (City), 5 (Customer Name) and 6 (Customer Gender) were not included and will thus not participate in any view derived from the cube.

It will be appreciated by persons skilled in the art that the present invention is not limited to what has been particularly shown and described hereinabove. Rather the scope of the present invention is defined by the appended claims and includes both combinations and sub-combinations of the various features described hereinabove as well as variations and modifications thereof which would occur to persons skilled in the art upon reading the foregoing description.

The invention claimed is:

1. A method of creating and managing a plurality of OLAP cubes in real time, from one or more different tabular data sources, comprising:
   receiving by a server a plurality of requests for a data, each in the form of a user query;
   in response to said requests, initiating the generation of a temporary OLAP cube for each request;
   automatically defining for each one of a plurality of cubes the table columns as either dimensions or measures of the cube using at least one of predefined semantics and data formats;
   generating the plurality of cubes using said defined dimensions and measures;
   populating a cube with data by applying the initiating query of the cube to the cube's data source;
   continuously and automatically identifying that data underlying one or more cubes has changed;
   automatically and in real-time updating the semantics of said one or more cubes; and
   managing said temporary cubes in a cache memory, said managing including cleaning up said cache by ongoing automatic deletion of cubes in said cache according to predefined criteria.

2. The method of claim 1, wherein the dimensions include hierarchies.

3. The method of claim 2, wherein the hierarchies are inferred automatically using at least one of said predefined semantics and predefined data formats.

4. The method of claim 1, wherein the tabular data source is in spreadsheet form.

5. The method of claim 1, wherein the tabular data source is a web service.

6. The method of claim 1, wherein the tabular data source comprises data convertible to tabular format.

7. The method of claim 1, wherein the tabular data source is a report in any reporting tool based on a relational source.

8. A method according to claim 1, comprising:
   requesting tabular data by a user; and
   generating an OLAP cube in response to said request.

9. A method according to claim 8, comprising
   requesting a data aggregation by said user; and
   retrieving said aggregation on said OLAP.

10. A method according to claim 9, wherein said requestings are performed using a desktop gadget.

11. A computerized system for providing OLAP cube capabilities in real time to a plurality of tabular data users comprising:
   a system server comprising a cache memory;
   a plurality of connections to client computers for communicating with the server; and
   one or more connections to a plurality of tabular data sources communicating with the server or with at least one of the client computers,
   the server configured to receive tabular data from said plurality of tabular data sources and including:
      (a) an OLAP tools module which
         (i) generates a plurality of temporary cubes from the data sources in response to a user query received over said plurality of connections and which defines for each cube the table columns as either dimensions or measures of the cube using at least one of predefined semantics and data formats,
         (ii) is configured to identify changes in the source data of a cube and automatically update a cubes in response to such identifying;
      (b) a cache for storing the temporary cubes therein; and
      (c) an automatic cleanup mechanism which automatically deletes at least one of said cubes from said cache according to predefined criteria.

12. The system of claim 11, wherein said OLAP tools module is configured to receive human input for said defining.

13. The system of claim 11, wherein said OLAP tools module is configured to automatically define hierarchies.

14. The system of claim 11, wherein the tabular data source is in spreadsheet form.

15. The system of claim 11, wherein the tabular data sources include a web service.

16. The system of claim 11, wherein the tabular data sources include data convertible to tabular format.

17. The system of claim 11, wherein the tabular data sources include a report in any reporting tool based on a relational source.

18. A system according to claim 11, comprising a desktop gadget which generates a request for aggregate information to said server and wherein said server is configured to answer said request from said temporary OLAP cubes.

* * * * *